(12) United States Patent
Donoho

(10) Patent No.: US 6,775,950 B2
(45) Date of Patent: Aug. 17, 2004

(54) DOUBLE BEND AND CRUSH BIRD DETERRENT DEVICE

(76) Inventor: Bruce Donoho, 23918 Skyline, Mission Viejo, CA (US) 92692

( * ) Notice: Subject to any disclaimer, the term of this patent is extended or adjusted under 35 U.S.C. 154(b) by 0 days.

(21) Appl. No.: 10/097,090

(22) Filed: Mar. 12, 2002

(65) Prior Publication Data

US 2003/0172575 A1 Sep. 18, 2003

(51) Int. Cl.$^7$ .......................... A01M 29/00; E04B 1/72
(52) U.S. Cl. ................................ 52/101; 43/1; 119/713
(58) Field of Search ................... 52/101; 43/1; 119/713, 119/903; 256/11

(56) References Cited

U.S. PATENT DOCUMENTS

| | | | |
|---|---|---|---|
| 2,298,194 A | | 10/1942 | Caldwell |
| 2,306,080 A | | 12/1942 | Peles |
| 2,475,047 A | * | 7/1949 | Peles ............................ 52/101 |
| 2,888,716 A | * | 6/1959 | Kaufmann .................... 52/101 |
| 3,282,000 A | * | 11/1966 | Shaw et al. .................... 52/101 |
| 3,407,550 A | * | 10/1968 | Shaw ............................ 52/101 |
| 5,400,552 A | | 3/1995 | Negre |
| 5,433,029 A | * | 7/1995 | Donoho et al. .................... 43/1 |
| 5,691,032 A | * | 11/1997 | Trueblood et al. .......... 428/136 |
| 5,765,319 A | * | 6/1998 | Callaghan, Jr. ............... 52/101 |
| 6,250,023 B1 | * | 6/2001 | Donoho ........................ 52/101 |
| 6,264,173 B1 | * | 7/2001 | Badger et al. ................ 256/10 |
| 6,457,283 B1 | * | 10/2002 | Jensen ......................... 52/101 |
| 2001/0017012 A1 | * | 8/2001 | Wiesener et al. ............. 52/101 |
| 2002/0011036 A1 | * | 1/2002 | Sabine ......................... 52/101 |

FOREIGN PATENT DOCUMENTS

| | | | | |
|---|---|---|---|---|
| GB | 2344269 A | * | 6/2000 | .......... A01M/29/00 |
| WO | WO 95/31099 | * | 11/1995 | .......... A01M/29/00 |

* cited by examiner

*Primary Examiner*—Brian E. Glessner
(74) *Attorney, Agent, or Firm*—Rutan & Tucker

(57) ABSTRACT

A bird deterrent device generally has a base, a plurality of mutually parallel directing channels, and a plurality of spikes extending from the base. The channels are preferably disposed in rows so they are not only mutually parallel, but also coplanar. The spikes are inserted into the channels, and then at least some of them are bent out so that the top ends of at least some of the various spikes are oriented at least 5 degrees out of parallel with respect to each other. The resulting spikes are therefore "fanned out," and tend to prevent birds from landing in the immediate vicinity of the device. The bottom of the spikes are fixed into the base in some manner, preferably using a second bend and then crushing portions of the base adjacent to the bent sections to maintain the spike in places.

21 Claims, 1 Drawing Sheet

US 6,775,950 B2

DOUBLE BEND AND CRUSH BIRD DETERRENT DEVICE

FIELD OF THE INVENTION

The field of the invention is bird deterrent devices.

BACKGROUND OF THE INVENTION

Birds like to perch in various places including rooftops, ledges, and other areas on buildings and homes. When birds perch, they tend to be noisy and make an unsightly mess. Generally, a device with some type of spikes extending out from it will prevent birds from perching. However, many types of devices suffer from one or more of the following disadvantages: (1) they are expensive to manufacture, (2) they are expensive to install, (3) they are dangerous to install, and (4) birds get hurt when they land on them.

For example, barbed wire can be used along the ledges and rooftops to try to circumvent these problems. Although barbed wire is effective in preventing birds from perching, birds often get hurt because they land on the barbed wire and their legs and wings get tangled in it. Also, barbed wire is difficult to install and secure because it does not effectively withstand wind and other harsh elements. Furthermore, some people do not like the appearance of barbed wire.

Another type of device is taught in U.S. Pat. No. 2,298,194 to Caldwell (Nov. 17, 1938). In this device, wire shanks that form a rounded portion are welded at the lower ends to each of two longitudinal wires. The device cleats have spaced bayonet slots for receiving the shanks and apertures for fastening the cleats to a surface. However, this device tends to be difficult and expensive to assemble because the shanks must be individually placed into each bayonet slot.

U.S. Pat. No. 2,306,080 to Peles (Jan. 7, 1942) teaches a strip of sheet metal with spaced triangular cut outs, so that when the sheet metal is bent and the triangular portions are cut out, the triangular portions form spikes. Although this device is relatively inexpensive to manufacture, it is tedious and dangerous to install because the sheet metal may have sharp edges.

Some bird deterrent devices contain a base that contains channels that extend in varying angles through the base support (Negre). The spikes are then inserted in the directing channels, so that each spike extends away from the base support in a different angle. Manufacturing this type of bird deterrent device is simple because it involves only two steps: (1) manufacturing a base support with directing channels extending in several directions; and (2) inserting the spikes into those directing channels.

Furthermore, U.S. Pat. No. 5,400,552 to Negre (Mar. 28, 1995) teaches a device that has spikes attached to a base support. The spikes are attached by flattening a portion of a cylindrically shaped spike, and pushing them through round canals in the base so that the flattened portion of the spikes becomes lodged in the base support. However, prolonged use or extreme weather conditions cause the flattened portion of the spikes to become loose and spin around inside the canals, making them much less effective.

Thus, there is still a need for an improved bird deterrent device that adequately circumvents these problems, while remaining simple and low cost.

SUMMARY OF THE INVENTION

The present invention comprises a bird deterrent device generally having a base containing directing channels, and a plurality of spikes extending from the directing channels.

In preferred embodiments, each of the plurality of spikes is substantially cylindrical and has a top end and a bottom end. Also, each spike contains a portion that is disposed in the directing channels with a portion of each spike extending partially through the top of the base. Additionally, the top ends of the spikes are oriented at least 5 degrees out of parallel with respect to each other. Furthermore, at least one spike has a bend that forms an angle of at least 5 degrees off normal, at or above the top of the base.

The bend is typically located at or above the base. The bend forms an angle that is at least 5 degrees off normal. It is preferred that the bend forms an angle that is at least 10 degrees off normal, and even more preferred that the angle formed is at least 15 degrees normal.

The base typically has a top and a bottom, a plurality of directing channels that each receives a portion of a spike, and one or more tip-containing channels that each receives a bottom end of a spike. Upon insertion, the spikes are typically parallel with respect to each other, and then at least one spike is bent above the base to form a useful configuration. The bottom ends of the spikes may also be bent, and may be inserted into the directing channels. The spikes are also fixed to the base. To ease manufacturing, it is preferred that the directing channels are normal to the top or bottom of the base. It is further preferred that the horizontal cross-sectional area of the directing channel is no more than 10% larger than the corresponding cross-sectional areas of the spikes.

At least one spike has a second bend that forms an angle of less than 180 degrees within 2 cm of the bottom end of the spike. More preferably, the second bend forms an angle of less than 90 degrees within 1 cm of the bottom end of the spike.

In a preferred aspect of the invention, the bird deterrent device has a base having a top and a bottom, and a plurality of spikes having a top end and a bottom end, wherein the top ends of the spikes extend from the top of the base, a portion of each spike passes through the top of the base, the top ends of the spikes are oriented at least 5 degrees out of parallel with respect to each other, at least one spike has a bend that forms an angle of 5 degrees off normal at the top of the base, and at least one spike contains a second bend that forms an angle of less than 90 degrees within 1 cm of the bottom end of the spike.

The present invention further comprises a method of fabricating a bird deterrent device by providing a base with a top and a bottom, inserting a portion of a spike into the base, extending a portion of the spike out of the top of the base, bending the spike to form an angle of at least 5 degrees within 20 cm of the top of the base, and fixing the spike to the base.

Various objects, features, aspects, and advantages of the present invention will become more apparent from the following detailed description of preferred embodiments of the invention.

DETAILED DESCRIPTION

Figure 1:
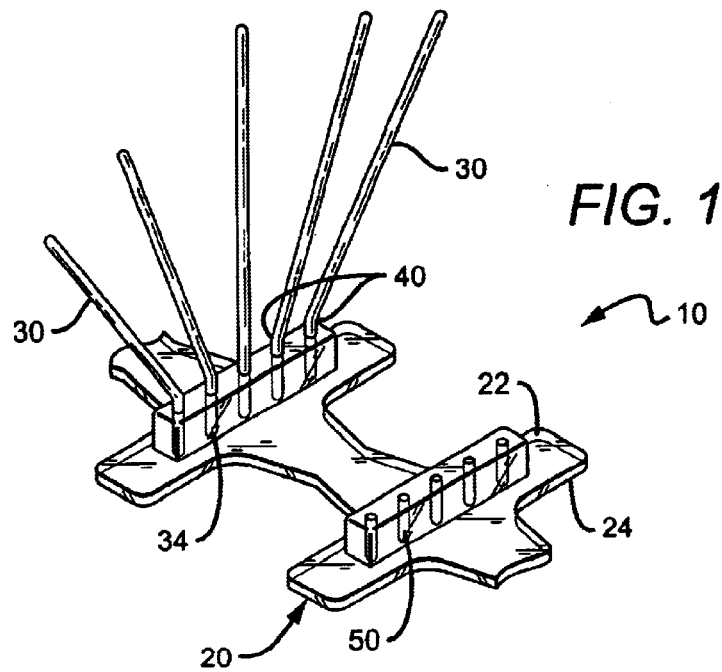
FIG. 1 is a perspective side view of a bird deterrent device according to the inventive subject matter.

FIG. 1 depicts a bird deterrent device 10, having a base 20, and a plurality of spikes 30. Each of the spikes 30 has a top end 32 and a bottom end 34. At least one of the spikes 30 has a bend 40, and a second bend 42. The base 20 has a top 22 and a bottom 24, and a grouping of directing channels 50.

Figure 2:
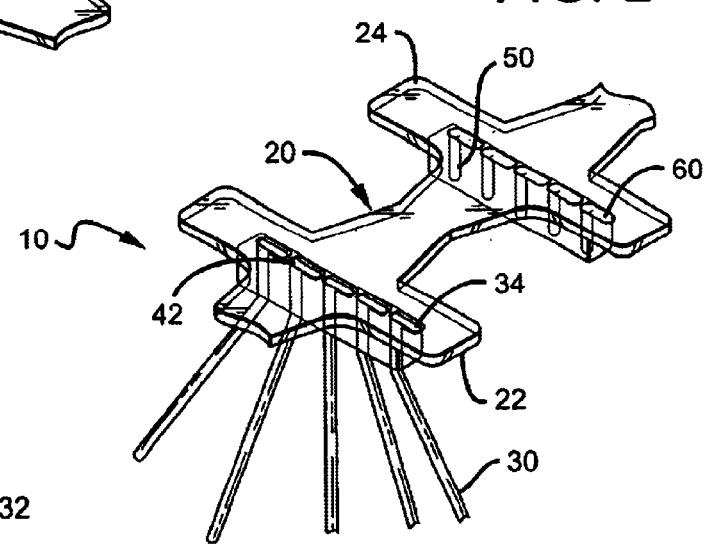
FIG. 2 is a bottom view of the bird deterrent device of FIG. 1.

FIG. 2 depicts the bird deterrent device 10 of FIG. 1, having a base 20 and a plurality of spikes 30. Each of the plurality of spikes 30 has a bottom end 34. At least one of the spikes 30 has a second bend 42. The base 20 has one or more directing channels 50 and one or more tip-containing channels 60.

Figure 3:
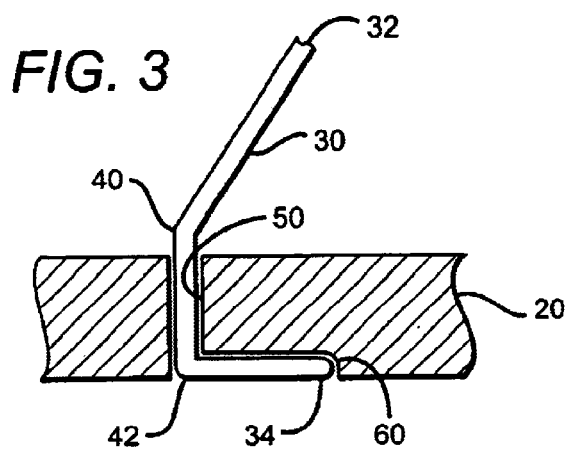
FIG. 3 is a side view of the spike of FIG. 1.

FIG. 3 depicts bird deterrent device 10 of FIGS. 1 and 2, having a base 20, a directing channel 50, a tip-containing channel 60, and a plurality of spikes 30 having top end 32 and a bottom end 34. At least one of the spikes 30 has a bend 40, and second bend 42.

The base 20 typically contains a top 22 and a bottom 24. The top 22 and bottom 24 of the base 20 may advantageously comprise any texture, including substantially flat, substantially ribbed, and substantially ridged. It is preferred that the top 22 is substantially ridged and the bottom 24 is substantially flat. It is further preferred that the ridges are positioned in any configuration, including rows, loops, adjacent strips, and diagonal strips. In more preferred embodiments, the ridges are positioned in rows less than 5 cm apart and contain one or more directing channels 50. In the most preferred embodiments, the ridges are positioned in rows less than 4.5 cm apart, and contain several directing channels 50.

Spikes 30 typically comprise a top end 32, a bottom end 34, may comprise a bend 40, and may comprise a second bend 42. Spikes 30 may be cut to form the top end 32 and the bottom end 34. A spike 30 is shown in detail in FIG. 3.

It is preferred that the top end 32 extends at least 20 cm out of the top 22 of the base 20. It is further preferred that the top end 32 extends at least 10 cm out of the top 22 of the base 20. It is contemplated that the bottom end 34 is positioned in or near the base 20. When the bottom end 34 is positioned in the base 20, it is preferred that the bottom end 34 is housed in the tip-containing channel 60.

The spikes 30 typically extend through the directing channel 50. It is preferred that the spikes 30 extend through the directing channel 50 so that the top end 32 and the bottom end 34 of the spikes 30 extend outward from the directing channel 50. In the most preferred embodiments, the directing channel 50 surrounds a portion of the sides of the spikes 30 so that the upper portion of the spikes 30 extend outward from the top edge of the directing channel 50, and the lower portion of the spikes 30 extend outward from the bottom edge of the directing channel 50.

The portion of the spikes 30 disposed in the directing channels 50 may comprise any length between 0.25 cm and 1 cm. Also, it is contemplated that the shape of the portion of the spikes 30 disposed in the directing channels 50 is substantially uniform. It is further contemplated that the portion of the spikes 30 disposed in the directing channels 50 may contain a portion of the bend 40 at the upper end. Thus, the portion of the spikes 30 disposed in the directing channels 50 may not be substantially straight. In preferred embodiments, the portion of the spikes 30 disposed in the directing channels is substantially cylindrical.

Upon insertion into the directing channels 50, the spikes 30 may be substantially parallel to each other. It is contemplated that the portion of the spikes 30 disposed in the directing channels 50 may extend normally (i.e. straight out) from the directing channels 50. The angle is measured to be some degrees off normal. The term "substantially parallel to each other" is taken in the usual meaning and does not require the parallel spikes to be coplanar. It is further contemplated that the spikes 30 are positioned so that the top ends 32 are oriented at least 5 degrees out of parallel with respect to each other. For example, if one spike 30 is substantially straight, the top end 32 of another spike 30 will be at least 5 degrees from the top end 32 of the substantially straight spike 30. Thus the term "out of parallel" in this context refers to the top ends 32 of the spikes 30 being not parallel to one another.

The spikes 30 may be bent at one or more locations. It is contemplated that one spike 30 will have a bend 40. Bend 40 is typically located at or above the top 22 of the base 20. It is further contemplated that the bend 40 may also occur within 20 cm of the top 22 of the base 20. Bend 40 is contemplated to occur near the top 22 of the base 20, but it is also contemplated that the bend 40 occurs near the top end 32 of the spike 30.

It is also contemplated that the bend 40 is either a gradual bend or a sharp bend. In preferred embodiments, the bend 40 is a gradual bend, where the bend 40 occurs on a portion of the spike 30 that is at least 0.5 cm long. It is further preferred that the bend 40 be a gradual bend, where the bend 40 occurs on a portion of the spike 30 that is at least 1 cm long. In the most preferred embodiments, the bend 40 is a gradual bend that extends more than 1.2 cm.

It is even further contemplated that several bends 40 may occur on a spike 30. For example, one bend may occur 2 cm from the top end 32 of spike 30 and another bend 40 may occur 8 cm from the top end 32 of spike 30.

It is contemplated that bend 40 is at least 5 degrees off normal. The term "off normal" refers to a spike 30 that is not sticking straight out of a directing channel 50. For example, if a directing channel 50 is normal to the top 22 or bottom 24 of the base 20, then the only way for the spike 30 to be off-normal is for the spike 30 to have a bend 40. In another example, if a directing channel 50 is not normal to the top 22 or the bottom 24 of the base 20, then the only way for the spike 30 to be off-normal, is for the spike 30 to have a bend 40. It is preferred that bend 40 forms an angle at least 10 degrees off normal. It is further preferred that bend 40 forms an angle at least 15 degrees off normal.

It is further contemplated that the plurality of spikes 30 are each positioned in a corresponding directing channel 50. The angles formed by the bend 40 on the spikes 30 form various useful configurations. Typical useful configurations may comprise a fan shape, alternating rows, gradually increasing rows, gradually decreasing rows, or any other useful configuration.

For example, a fan shaped configuration may comprise a base 20 that contains five spikes 30, wherein the center spike 30 does not contain a bend 40, so that the center spike 30 forms an angle of 90 degrees with the base 20; the two outermost spikes 30 contain a bend 40 that forms an angle of 30 degrees with the base 20; and the remaining two spikes 30 contain a bend 40 that forms an angle between 30 degrees and 90 degrees with the base 20.

It is contemplated that spikes 30 may or may not contain a second bend 42. In preferred embodiments, each spike 30 contains a second bend 42. Second bend 42, more clearly shown in FIG. 2, is typically located within 2 cm of the bottom end 34 of each spike 30. It is contemplated that the second bend 42 is either a gradual bend or a sharp bend. It is preferred that the second bend 42 is a gradual bend, where the second bend 42 occurs on a portion of the spike 30 that is at least 0.5 cm long. It is further preferred that the second bend 42 be a gradual bend, where the second bend 42 occurs on a portion of the spike 30 that is at least 1 cm long. In the most preferred embodiments, the second bend 42 is a gradual bend that extends more than 2 cm.

Second bend 42 may form an angle between the bottom end 34 and the portion of the spikes 30 disposed in the directing channels 50, wherein the angle is less than 180 degrees. As the second bend 42 forms an angle that approaches 180 degrees, the spike 30 becomes substantially straight. As the second bend 42 forms an angle that approaches 0 degrees, the spike 30 will begin to resemble a very tight "U" shape. It is preferred that the second bend 42 forms an angle between 70 degrees and 150 degrees. In more preferred embodiments, the second bend 42 may form an angle between 80 degrees and 120 degrees. In the most preferred embodiments, the second bend 42 may form an angle between 85 degrees and 95 degrees.

Spikes 30 may comprise metal, plastic, wood, or any mixture thereof. In preferred embodiments, spikes 30 comprise a metal such as aluminum, steel or metal alloy. In the most preferred embodiments, spikes 30 comprise marine grade stainless steel.

A plurality of directing channels 50 may be positioned in any configuration including rows, loops, or staggered. The directing channels 50 may be adjacent to one another, with at least 0.20 cm between them. In preferred embodiments, the directing channels 50 are positioned in rows, where the rows are spaced at least 3.5 cm apart, and the directing channels are spaced at least 0.25 cm apart. In the most preferred embodiments, the directing channels 50 are positioned in rows, where the rows are spaced at least 3 cm apart, and the directing channels are spaced at least 0.4 cm apart.

The directing channels 50 are substantially parallel to each other. The term "substantially parallel" is taken in the usual meaning and does not require the parallel directing channels 50 to be coplanar. However, it is preferred that the plurality of directing channels 50 form groupings of directing channels 50. It is contemplated that each grouping of directing channels 50 may form a row. When substantially parallel directing channels 50 form rows, the substantially parallel directing channels 50 must be coplanar. In most preferred embodiments, each grouping of directing channels 50 comprises substantially parallel directing channels 50 that form a row and are coplanar with respect to each other.

Directing channels 50 may be sized and dimensioned to receive a portion of the spikes 30. It is contemplated that the horizontal cross-sectional area of the directing channel 50 is less than 25% larger than a corresponding cross-sectional area of the portion of the spikes 30 disposed in the directing channels 50. It is preferred that the directing channel 50 has a horizontal cross-sectional area that is less than 20% larger than a corresponding cross-section of the portion of the spikes 30 disposed in the directing channels 50. It is most preferred that the directing channel 50 has a horizontal cross-section that is less than 10% larger than a corresponding cross-section of the portion of the spikes 30 disposed in the directing channels 50.

Each directing channel 50 may or may not house a spike 30. For example, the spikes 30 may be positioned in every other directing channel 50 or in every third directing channel 50. It is preferred that every other directing channel 50 receive a spike 30 when the directing channels 50 are placed less than 0.75 cm apart.

Typically, the directing channel 50 extends from the top 22 of the base 20 to the bottom 24 of the base 20. However, the directing channel 50 may not extend to the bottom 24 of the base 20. Contemplated shapes of the directing channel 50 include substantially cylindrical, substantially rectangular, substantially triangular, and jagged. In preferred embodiments, the directing channel extends from the top 22 to the bottom 24 of the base 20, and is substantially cylindrical. In more preferred embodiments, the directing channel extends from the top 22 to 0.2–0.4 cm from the bottom 24 of the base 20, and is substantially cylindrical.

As illustrated in FIG. 2, tip-containing channel 60 is typically proximally located near the directing channel 50 and may be adjacent to the directing channel 50. The tip-containing channel 60 may be sized and dimensioned to receive the bottom end 34 of a spike 30 and a portion of the spike 30 that is adjacent to the bottom end 34. It is preferred that the tip-containing channel 60 be adjacent to the directing channel 50 so that the tip-containing channel 60 receives the bottom end 34 of a spike 30 and a portion of the spike 30 adjacent to the bottom end 34. It is also preferred that the second bend 42 is positioned between the directing channel 50 and the tip-containing channel 60. In the most preferred embodiments, the directing channel 50 will feed into the tip-containing channel 60 so that the middle of the second bend 42 is located at the intersection of the directing channel 50 and the tip-containing channel 60.

Fixing the spikes 30 to the base 20 may comprise crushing a portion of the base 20 adjacent the spike 30 or coupling the spike 30 to the base 20 with a coupler. It is preferred that the spike 30 is fixed to the base 20 by crushing a portion of the base 20 that is adjacent to the spike 30.

Base 20 may comprise plastic, wood, metal, or any combination thereof. It is preferred that the base 20 comprise hard plastic, metal, or a combination thereof. It is most preferred that the base 20 comprise hard plastic.

Base 20 may be sized and dimensioned to be effectively coupled to a surface. It is preferred that the base 20 contains couplers including loops, holes, fasteners, and latches. It is further preferred that the base 20 contains loops or holes that are sized and dimensioned to receive a nail or screw. It is most preferred that the base 20 contains round holes to receive nails or screws.

What is claimed is:

1. A bird deterrent device, comprising:
   a base having a top and a bottom;
   a plurality of spikes, each of which has a top end and a bottom end;
   a plurality of directing channels extending through at least the top of the base, and substantially parallel to each other;
   the top ends of the plurality of spikes oriented at least 5 degrees out of parallel with respect to each other; and
   the bottom end of at least one of the plurality of spikes terminates at the base and has two bends at the base.

2. The bird deterrent device of claim 1, wherein at least one of the directing channels is normal to the top or bottom of the base.

3. The bird deterrent device of claim 1, wherein a horizontal cross-sectional area of a specific one of the plurality of directing channels is no more than 10% larger than a corresponding cross-sectional areas of a corresponding spike.

4. The bird deterrent device of claim 1, wherein all the plurality of spikes are substantially cylindrical.

5. The bird deterrent device of claim 1, wherein at least one of the bends forms an angle of less than 180 degrees within 2 cm of the bottom end of that spike.

6. The bird deterrent device of claim 1, wherein at least one of the bends forms an angle of less than 90 degrees within 1 cm of the bottom end of that spike.

7. The bird deterrent device of claim 1, wherein the top end of each of the plurality of spikes is at least 10 cm from the top of the base.

8. The bird deterrent device of claim 1, wherein at least one of the plurality of spikes is substantially normal to the top or the bottom of the base.

9. The bird deterrent device of claim 1, wherein the top ends of the plurality of spikes are oriented at least 10 degrees out of parallel with respect to each other.

10. The bird deterrent device of claim 1, wherein the top ends of the plurality of spikes are oriented at least 15 degrees out of parallel with respect to each other.

11. The bird deterrent device of claim 1, wherein at least one of the plurality of spikes has a bend that forms an angle of at least 10 degrees at or above the top of the base.

12. The bird deterrent device of claim 1, wherein at least one of the plurality of spikes has a bend that forms an angle of at least 15 degrees at or above the top of the base.

13. The bird deterrent device of claim 1, wherein the base comprises a tip-containing channel that receives the bottom end of one of the plurality of spikes.

14. The bird deterrent device of claim 1, wherein each of the plurality of spikes is fixed to the base.

15. The bird deterrent device of claim 1, wherein a grouping of the plurality of directing channels is coplanar.

16. A method of fabricating a bird deterrent device, comprising:

providing a base with a top and a bottom;

inserting a portion of a plurality of spikes into the base such that a portion of each of the plurality of spikes extends out of the top of the base;

bending at least one of the plurality of spikes at or within 2 cm above the top of the base to form an angle of at least 5 degrees off normal relative to the base; and crushing the base adjacent to the bent spike.

17. The method of claim 16, wherein at least one of the plurality of spikes has a bend of at least 5 degrees above the top of the base.

18. The method of claim 16, wherein the step of bending comprises bending the at least one of the plurality of spikes at least 10 degrees at or above the top of the base.

19. The method of claim 16, wherein the step of bending comprises bending the at least one of the plurality of spikes at least 15 degrees at or above the top of the base.

20. The method of claim 16, wherein the step of bending further comprises bending the at least one of the plurality of spikes at a second bend to form an angle of less than 180 degrees within 1 cm of the bottom end.

21. The method of claim 16, wherein the step of bending further comprises bending the at least one of the plurality of spikes at a second bend to form an angle of less than 90 degrees within 1 cm of the bottom end.

* * * * *